(12) United States Patent
Pan et al.

(10) Patent No.: US 9,485,626 B2
(45) Date of Patent: Nov. 1, 2016

(54) BUILDING FLOOR DETERMINATION FOR A LOCATION BASED SERVICE

(71) Applicants: Xiaoyong Jacky Pan, Shanghai (CN); Justin Lipman, Shanghai (CN); Robert A. Colby, Granite Bay, CA (US); INTEL CORPORATION, Santa Clara, CA (US)

(72) Inventors: Xiaoyong Jacky Pan, Shanghai (CN); Justin Lipman, Shanghai (CN); Robert A. Colby, Granite Bay, CA (US)

(73) Assignee: Intel Corporation, Santa Clara, CA (US)

(*) Notice: Subject to any disclaimer, the term of this patent is extended or adjusted under 35 U.S.C. 154(b) by 127 days.

(21) Appl. No.: 13/997,572

(22) PCT Filed: Mar. 19, 2013

(86) PCT No.: PCT/CN2013/072885
§ 371 (c)(1),
(2) Date: Jun. 24, 2013

(87) PCT Pub. No.: WO2014/146255
PCT Pub. Date: Sep. 25, 2014

(65) Prior Publication Data
US 2016/0037305 A1  Feb. 4, 2016

(51) Int. Cl.
*H04W 24/00* (2009.01)
*H04W 4/04* (2009.01)
(Continued)

(52) U.S. Cl.
CPC ............ *H04W 4/043* (2013.01); *G01S 5/0252* (2013.01); *H04W 4/02* (2013.01); *H04W 64/00* (2013.01)

(58) Field of Classification Search
CPC ... H04W 36/30; H04W 36/18; H04W 36/08; H04W 36/0011; H04W 36/0083; H04W 64/00; H04W 84/045; H04W 84/12; H04W 88/08; H04W 36/0016; H04W 36/0022; H04W 36/0072; H04W 76/007; H04W 16/24; H04W 36/00
See application file for complete search history.

(56) References Cited

U.S. PATENT DOCUMENTS

2005/0176406 A1* 8/2005 Krishnakumar .......... G01S 5/02
455/410
2006/0019679 A1* 1/2006 Rappaport ............ H04W 64/00
455/456.5

(Continued)

FOREIGN PATENT DOCUMENTS

CN  101001432 A  7/2007
CN  101242624 A  8/2008

(Continued)

OTHER PUBLICATIONS

International Search Report and Written Opinion received for PCT Patent Application No. PCT/CN2013/072885, mailed on Dec. 26, 2013, 10 Pages.

(Continued)

*Primary Examiner* — Nimesh Patel
(74) *Attorney, Agent, or Firm* — Garrett IP, LLC

(57) ABSTRACT

A device stores an indication of a current floor of a multiple floor building on which a device is located. The device measures signal strengths of signals received at the device from transmitters having known locations on the floors of the building. The device selects one of the multiple floors as a candidate floor based in part on the measured signal strengths. The device increases a confidence level associated with the indication of the current floor if the candidate floor corresponds to the current floor, and decreases the confidence level if the candidate floor does not correspond to the current floor. The device replaces the indication of the current floor with the candidate floor if the confidence level is below a threshold.

20 Claims, 8 Drawing Sheets

(51) Int. Cl.
*H04W 4/02* (2009.01)
*H04W 64/00* (2009.01)
*G01S 5/02* (2010.01)

(56) References Cited

U.S. PATENT DOCUMENTS

| | | | | |
|---|---|---|---|---|
| 2008/0076430 | A1* | 3/2008 | Olson | H04W 36/32 |
| | | | | 455/440 |
| 2009/0067392 | A1* | 3/2009 | Hart | G01S 5/02 |
| | | | | 370/338 |
| 2012/0315918 | A1 | 12/2012 | Kadous | |
| 2015/0030004 | A1* | 1/2015 | Belleschi | H04W 36/04 |
| | | | | 370/332 |

FOREIGN PATENT DOCUMENTS

| | | | |
|---|---|---|---|
| CN | 101466070 | A | 6/2009 |
| CN | 101631349 | A | 1/2010 |
| CN | 102170697 | A | 8/2011 |
| CN | 102571389 | A | 7/2012 |
| CN | 102791025 | A | 11/2012 |
| CN | 102821356 | A | 12/2012 |
| CN | 102972072 | A | 3/2013 |
| WO | 2005/091905 | A2 | 10/2005 |
| WO | 2014/056183 | A1 | 4/2014 |

OTHER PUBLICATIONS

International Search Report and Written Opinion received for PCT Patent Application No. PCT/CN2012/082843, mailed on Jul. 18, 2013, 10 Pages.

International Search Report and Written Opinion received for PCT Patent Application No. PCT/CN2013/072532, mailed on Dec. 19, 2013, 12 Pages.

Office Action received for Korean Patent Application No. 10-2015-7022313 mailed on May 18, 2016, 6 pages of Korean Office Action.

\* cited by examiner

US 9,485,626 B2

BUILDING FLOOR DETERMINATION FOR A LOCATION BASED SERVICE

BACKGROUND

A location based service (LBS) provides a service based on location. The LBS may include a server-based LBS application hosted on an Internet server that is paired with a client-based LBS application hosted on an Internet Protocol (IP)-capable client device (CD), which may be stationary or mobile. The paired LBS applications may communicate with each other over the Internet. Typically, the LBS acquires a current location of the CD, and then provides an appropriate service to a consumer of the LBS, e.g., a user of the CD, based on the current location. For example, the LBS may cause the CD to display a geographical map indicating the current location, and provide audible directions that direct the user to a point-of-interest, such as a store or a restaurant in a shopping mall, etc.

Trilateration is a technique for determining a relative or an absolute location of the CD. Trilateration relies on signals that are transmitted to the CD from transmitters associated with reference points (RPs), e.g. Wi-Fi access points (APs) and beacons, having known locations. Trilateration may be used to calculate a location of the CD in a planar direction, i.e., a plane geometric location of the CD, such as its relative x, y or absolute latitude, longitude coordinates. When the CD is in a multi-story building that hosts multiple RPs dispersed across different floors of the building, the CD typically receives RP signals that originate from the different floors, including the floor on which the CD is located. Simple trilateration is insufficient to locate the CD reliably in both a planar direction and a vertical direction, e.g., to an altitude or a floor of the building.

In the multi-story environment, conventional techniques, including trilateration, that use received RP signals to detect the floor on which the CD is located, tend to be error prone, i.e., often detect an incorrect floor. This is because such techniques may simply detect the floor that originates either a strongest one of the RP signals (as received at the CD), or the most RP signals. In either case, the CD may be located on a floor different from that originating either the strongest or the most RP signals. Incorrect floor information may translate to erroneous LBS operation. For example, a map indicating a location of a CD in a multi-story building may intermittently represent the CD on incorrect floors, and thereby "jump" back-and-forth between floors depicted in the map, thus confusing the LBS consumer.

Figure 1:
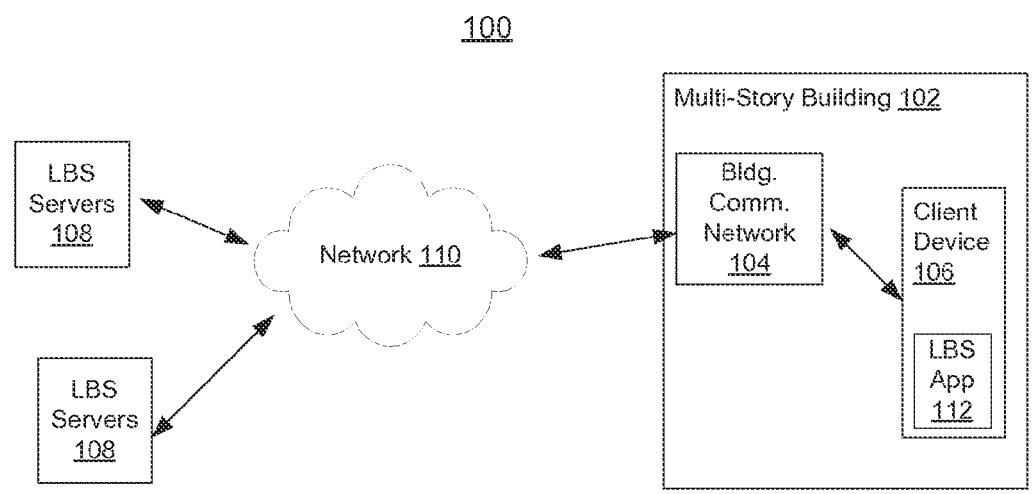
FIG. 1 is a block diagram of an example location based service (LBS) environment.

In the drawings, the leftmost digit(s) of a reference number identifies the drawing in which the reference number first appears.

DETAILED DESCRIPTION

LBS Environment

FIG. 1 is a block diagram of an example environment 100 to provide a location based service (LBS). Environment 100 includes a multi-story (i.e., multi-floor) building or edifice 102; a building communication network 104 located in and/or around the building; and a client device 106, located in the building and configured to communicate with the building communication network. Environment 100 also includes: one or more servers 108 each to host server-side LBS applications and related databases that support the LBS; and a communication network 110, such as the Internet, through which the servers, building communication network 106, and client device 106 may communicate.

Client device 106 may host a client-side LBS application 112 to communicate with peer LBS applications on servers 108, and provide the LBS to a user of the client device. LBS application 112 may request and use location information related to client device 102, such as a location of the client device in the building, and a floor on which the client device is located. As will be described below, client device 106 is configured to receive signals from building communication network 104 and process the received signals in accordance with embodiments described herein.

Figure 2:
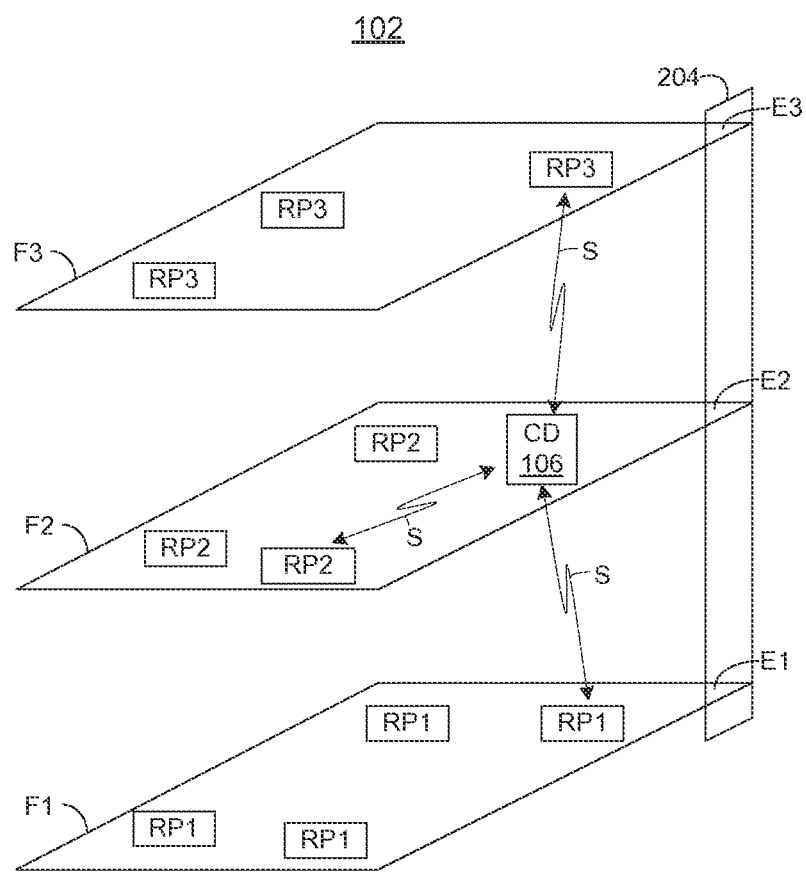
FIG. 2 is a simplified, perspective, example interior view of a multi-story building in the environment of FIG. 1.

FIG. 2 is a simplified, perspective, example interior view of multi-story building 102. Building 102 includes multiple vertically-spaced floors F1, F2, and F3 having respective floor entries/exits E1, E2, and E3 (also referred to as floor access ways) each opening into a vertically extending stairwell and/or elevator shaft 204 that provides access/service to/from all of the floors. Building communication network 104 (depicted in FIG. 1 only as a single block) includes multiple sets of spaced-apart reference points (RPs) RP1, RP2, and RP3 located at known locations on each of floors F1, F2, and F3, respectively, Note that "RP1" generally indicates multiple RPs on the first floor, "RP2" generally indicates multiple RPs on the second floor, and so on.

The RPs RP1-RP3 may include, without limitation, Wi-Fi access points (APs) and beacons. As such, each of RPs RP1-RP3 typically includes a transmitter-receiver (transceiver) pair to transmit and receive (i.e., transceive) wireless and/or wired communication signals S, such as radio-frequency (RE) signals. RPs among RP1-RP3 configured as beacons may include only a transmitter to transmit signals. All of the RPs depicted in FIG. 2 may transmit communication signals to client device 106, however, only three communication signals (S) are explicitly depicted in FIG. 2, so as to avoid undue confusion. RPs RP1-RP3 may be incorporated in one or more wireless local area networks (WLANs) that operates in accordance with any number of wireless standards, such as the Institute of Electrical and Electronics Engineers (IEEE) 802.11 standards. Alternatively, the RPs may be incorporated in stand-alone point-to-point communication systems that are not part of a network.

RPs RP1-RP3 may transceive communication signals with each other and with client device 102. RPs RP1-RP3, and client device 106, may also communicate with LBS servers 108 over communication network 110. As depicted in FIG. 2, client device 106 may transceive signals with RPs RP2 located on the same floor (i.e., floor F2) as the client device, and with RPs RP1 and RP3 located on different floors (i.e., floors F1 and F3) from that of the client device.

As mentioned above, embodiments described herein determine a location of client device 104 in building 102, including a current floor of the building on which the client device is located. Such embodiments assume that certain RP-related information is known a priori and accessible as necessary to components in environment 100. Such RP-related information may include:

(i) a list of RP identifiers (IDs) and network addresses of all of the deployed RPs in the sets of RPs RP1-RP3;

(ii) for each listed ID, a real-world (deployed) i.e., geographical coordinates, of the RP associated with that ID;

(iii) for each listed ID, a floor (e.g., F1, F2, or F3) of building 102 on which the RP associated with that ID is located; and (iv) for each listed ID, a predetermined transmit power level of the RP associated with that ID.

Example RP-related information for three RPs identified as A, B, and C among RPs RP1-RP3 is provided in Table 1 below:

TABLE 1

| RP ID | RP Geog. Location (e.g., x, y, z and/or latitude (lat), longitude (long), altitude (alt) coordinates) | Building Floor ID and/or Altitude (alt) | RP Transmit Power (TP) (e.g., Watts/dBs) |
|---|---|---|---|
| A | $x_A, y_A, z_A$ - $lat_A, long_A, alt_A$ | $F_A, alt_A$ | $TP_A$ |
| B | $x_B, y_B, z_B$ - $lat_B, long_B, alt_B$ | $F_B, alt_B$ | $TP_B$ |
| C | $x_C, y_C, z_C$ - $lat_C, long_C, alt_C$ | $F_C, alt_C$ | $TP_C$ |

In addition to the RP-related information explicitly indicated in Table 1, the RP-related information may include an associated record indicating a total number of floors in the building hosting the RPs listed in the table. The building information may indicated In Table 1, the z-coordinate of a given RP may correspond to an altitude or height of a given floor in building 102 on which the RP is located.

Each of RPs RP1-RP3 may be provisioned with its corresponding RP-related information, e.g., its RP ID, geographical location, building floor, and transmit power, and may transmit such information to client device 106 automatically and repeatedly, or, only when requested to do so. Additionally, and/or alternatively, the RP-related information may be stored as RP-information records in one or more databases residing in servers 108. Such records may be indexed according to RP ID, or any other suitable index, and may be accessed by client device 106 and/or RPs RP1-RP3 through network 110.

Method Flowcharts

Figure 3:
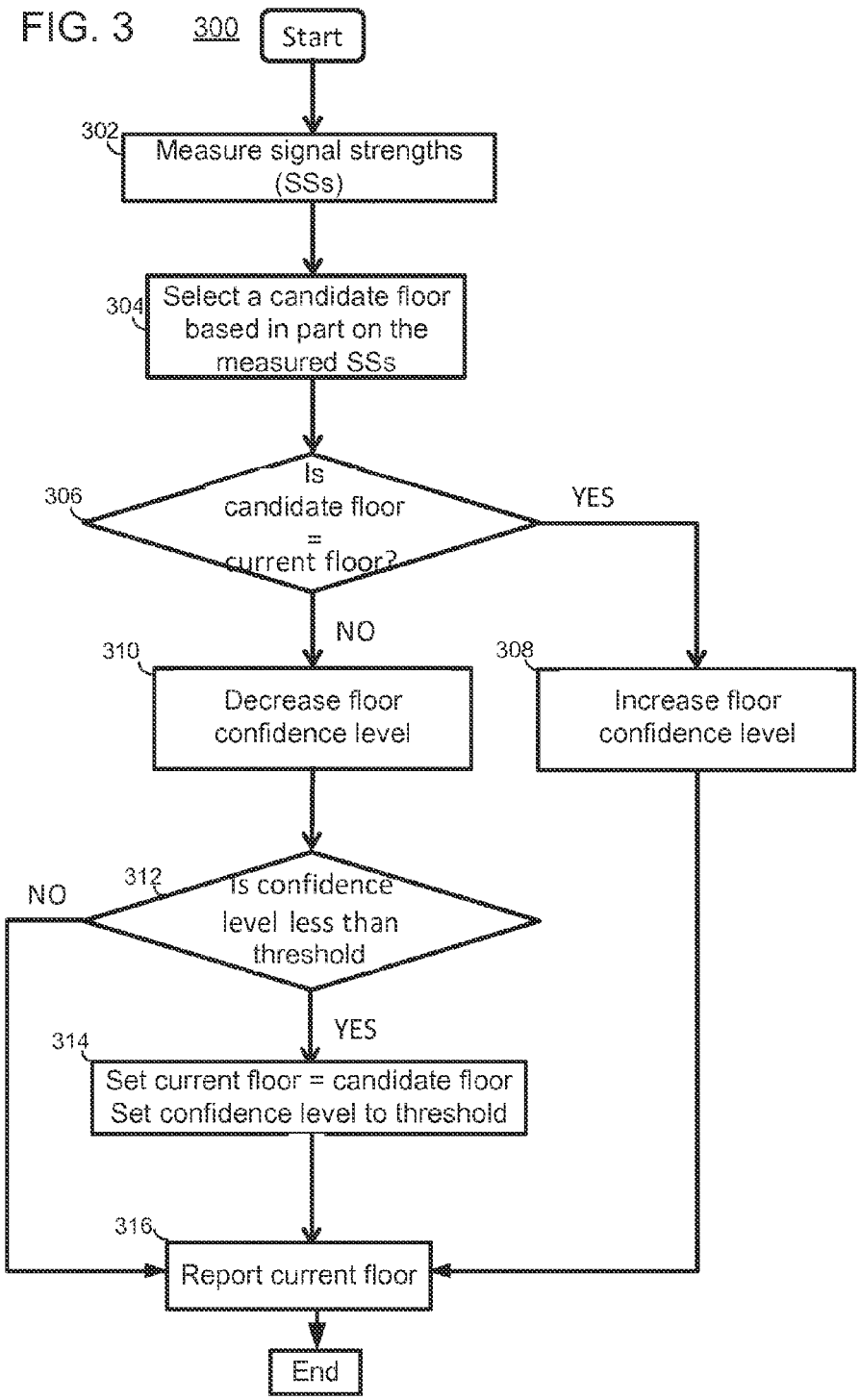
FIG. 3 is a flowchart of an example method of determining a current floor on which a client device is located in a multi-story building.

FIG. 3 is a flowchart of an example method 300 used to determine a current floor on which a client device is located in a multi-story building. Method 300 may be invoked repeatedly to track movements of a client device between floors over time, and in response to a location request from an LBS application.

By way of example, method 300 is described with reference to environment 100, as depicted in FIGS. 1 and 2. However, it is to be understood that method 300 may be implemented in other environments. To the extent that method 300 relies on access to RP-related information, such as RP IDs, locations (including floor designations), transmit powers, etc., such information may be received directly from RPs RP1-RP3, or may be accessed over communication network 110.

To avoid ambiguity, it is to be understood that the floors referenced in FIG. 3 and manipulated by method 300, e.g., "candidate floor" and "current floor," are indications/representations of the actual floors in a building. Such floor indications may be stored as variables in client device 106 (e.g., as floor values or identifiers, such as F1, F2, etc.) to be manipulated in accordance with method 300.

Method 300 employs a confidence level (as described below) that the current floor (i.e., indication of the current floor as determined in method 300) is correct. The floor confidence level (also referred to herein simply as the "confidence level") may range in value from a predetermined minimum level (i.e., minimum level) to a predetermined maximum level (i.e., maximum level), e.g., from 1 to 10 in increments of 1. In method 300, the confidence level may be initialized to the minimum level.

In an embodiment, all of operations 302-316 of method 300 described below may be implemented in client device 106. In such an embodiment, it is assumed that white executing method 300, client device 106 has access to the necessary RP-related information, e.g., such as listed in Table 1. In an alternative embodiment, operation 302 may be implemented in the client device while some or all of the remainder of operations 304-316 may be implemented in one or more of servers 108.

At 302, a receiver of client device 106 receives signals transmitted from RPs RP1-RP3, and measures respective signal strengths of the received signals, i.e., measures received signal power levels. Each measured signal strength is also referred to herein as a received signal strength indication (RSSI). The measured signal strengths are accessible by method 300.

At 304, one of the floors F1-F3 is selected as a candidate floor on which client device 106 may be located based at least in part on the measured signal strengths from 302. The candidate floor may be selected in accordance with Candidate Floor Selection Method 1 or Method 2 described below, or any other suitable method that uses the measured signal strengths, as would be appreciated by one of ordinary skill in the relevant art(s) having read the present description.

Note that, in a first pass through method 300, at 304, the current floor may be initially set equal to the candidate floor selected at 304.

At 306, it is determined if the candidate floor is equal to the current floor.

If at 306 it is determined that the candidate floor is equal to the current floor, then at 308, the confidence level is increased by a predetermined amount, such as 1, and flow proceeds to 316.

If at 306 it is determined that the candidate floor is not equal to the current floor, then at 310, the confidence level is decreased, as described further below in connection with FIG. 4, and flow proceeds to 312.

At 312 it is determined if the confidence is less than a minimum threshold. In an embodiment, the threshold is equal to the minimum confidence level, e.g., 1, but the threshold may be set to a different value.

If at 312 it is determined that the confidence is not less than the threshold, then flow proceeds to 316.

If at 312 it is determined that the confidence is less than the threshold, then flow proceeds to 314, where (i) the current floor is set equal to, i.e., replaced by, the candidate floor selected in 304, and (ii) the confidence level is set equal to the threshold. From 314, flow proceeds to 316.

At 316, the current floor may be reported to an LBS in response to an earlier request for device location and/or floor information.

Method 300 may be performed repeatedly, i.e., each time device 106 scans its environment for the presence of signals and measures their signal strengths. Each pass through method 300 determines a current floor (that may be reported at 316), which then becomes a "previously determined" current floor to be used in a next pass through the method, i.e., that is used in the compare at 306 in the next pass, and that may be replaced at 314 in the next pass with the candidate floor selected at 304 of the next pass.

Candidate Floor Selection

In method 300, a candidate floor may be selected at 304 in a manner now described.

First, preliminary information, including path losses and distances, is determined follows.

Assume a client device (CD) scans its environment for signals from RPs, and the scan detects RPs in the set $\{RP_i\}$, i=1~N.

The set of detected RPs $\{RP_i\}$ is sorted in an ascending order based on a calculated distance between the CD and each RP. The distance may be calculated using a propagation model, such as the following Free Space Path Loss (FSPL) model:

$$L = 20\log_{10}\left(\frac{4\pi d}{\lambda}\right)$$

where L is the path loss in decibels (dB), $\lambda$ is the wavelength, and d is the RP-CD distance in the same units as the wavelength.

The path loss L may be obtained according to the following:

$$L = dBt - dBr$$

where dBt is the transmitted power in dB (know transmitter power is available from the RP-related information in Table 1), and dBr is the received signal strength indication (RSSI) in dB (as measured in the CD).

Once the pass loss L is known, then the distance d is calculated,

Sorting the set of detected RPs $\{RP_i\}$ in the ascending order based on the calculated distance between the CD and each RP is equivalent to sorting in an ascending order based on the path loss L, and also RSSI.

The FSPL model requires knowledge of the transmit power of the RPs. In a case where the transmit powers are unknown, the set of $\{RP\}$ may be sorted based on RSSI in a descending order, i.e., the RP corresponding to the highest RSSI is assigned a weight (N+1−1), the RP corresponding to the $2^{nd}$ highest RSSI is assigned a weight (N+1−2), and so on.

Once the above described preliminary information is determined, then a candidate floor is selected using one or both of Candidate Floor Selection Method 1 and Candidate Floor Selection Method 2, described below:

Candidate Floor Selection Method 1

Candidate Floor Selection Method 1 involves weighting RPs based on their corresponding RSSIs. In Method 1, each reference point $RP_i$ is assigned a weight (N+1−i). The RP-related information in Table 1 indicates the floor on which each RP is located. For each floor, a floor weight (FW) is calculated as a sum of the weights of the RPs located on that floor. The floor having the greatest floor weight is selected as the candidate floor for the current floor.

Summarizing, Method 1 includes:

assigning weights to the RPs (and thus, the received signals) based on the RSSI corresponding to each of the RPs;

computing a floor weight corresponding to each floor as a sum of the weights assigned to the RPs located on the given floor; and selecting the floor having the greatest floor weight as the candidate floor.

Candidate Floor Selection Method 2

Candidate Floor Selection Method 2 may be applied solely or in a case where two floors have similar weights (e.g. their difference is less than a predetermined weight difference, such as 2) as computed in Method 1.

Candidate Floor Selection Method 2 includes calculating floor signal compensation for RPs in each floor using a self-adaptive path loss model More specifically, Method 2 includes an adaptive method that utilizes the known locations of the RPs in the environment (e.g., building) to continuously adapt and compensate for error prone RSSIs used in a propagation model (e.g. FSPL described in connection with Method 1). A compensation (D) is calculated using the formula below, which takes into consideration a difference between GeoDist (i.e., a distance calculated based on spatial dispersion of RPs) and RSSIDist (i.e., a distance calculated based on FSPL).

$$D = 20\log_{10}\left(\frac{4\pi d'}{\lambda}\right) - L$$

where L is the path loss in decibels (dB), $\lambda$ is the wavelength, and d' is a possible RP-CD (i.e., RP-CD receiver) distance that is based on the RP's spatial dispersion (GeoDist) in the same units as the wavelength.

Accordingly, a set of $\{Di\}$ is calculated for the set $\{RP_i\}$, i=1~N. The set of $\{Di\}$ is divided into a series of sets $\{Dj\}$, j=1~K for each floor, where K is the number of RPs detected on a floor through in a floor. Then for each floor, floor compensation (FD) is calculated using the formula:

$$FD = \frac{1}{\sum_{j=1}^{K}\left(\frac{1}{2}\right)^j}\sum_{j=1}^{K}D_j\left(\frac{1}{2}\right)^j,$$

if all Dj are more than or equal 0 or

FD=Minimum ($\{Di\}$), if there is one D in the set of $\{Dj\}$ less than 0

The floor with a least ED (which means the signal compensation for the RPs in this floor is less than that of all of the other floors) is selected as the candidate floor.

Summarizing the foregoing, Method 2 includes:

computing a signal compensation (D) for each of the RPs based on (i) a possible maximum or minimum spatial distance (d') between the client device and the RP, and (ii) a path loss (L) from the RP;

computing a floor signal compensation for each floor based on the signal compensation of the RPs in the floor; and selecting the floor having the lowest floor signal compensation as the candidate floor.

Figure 4:
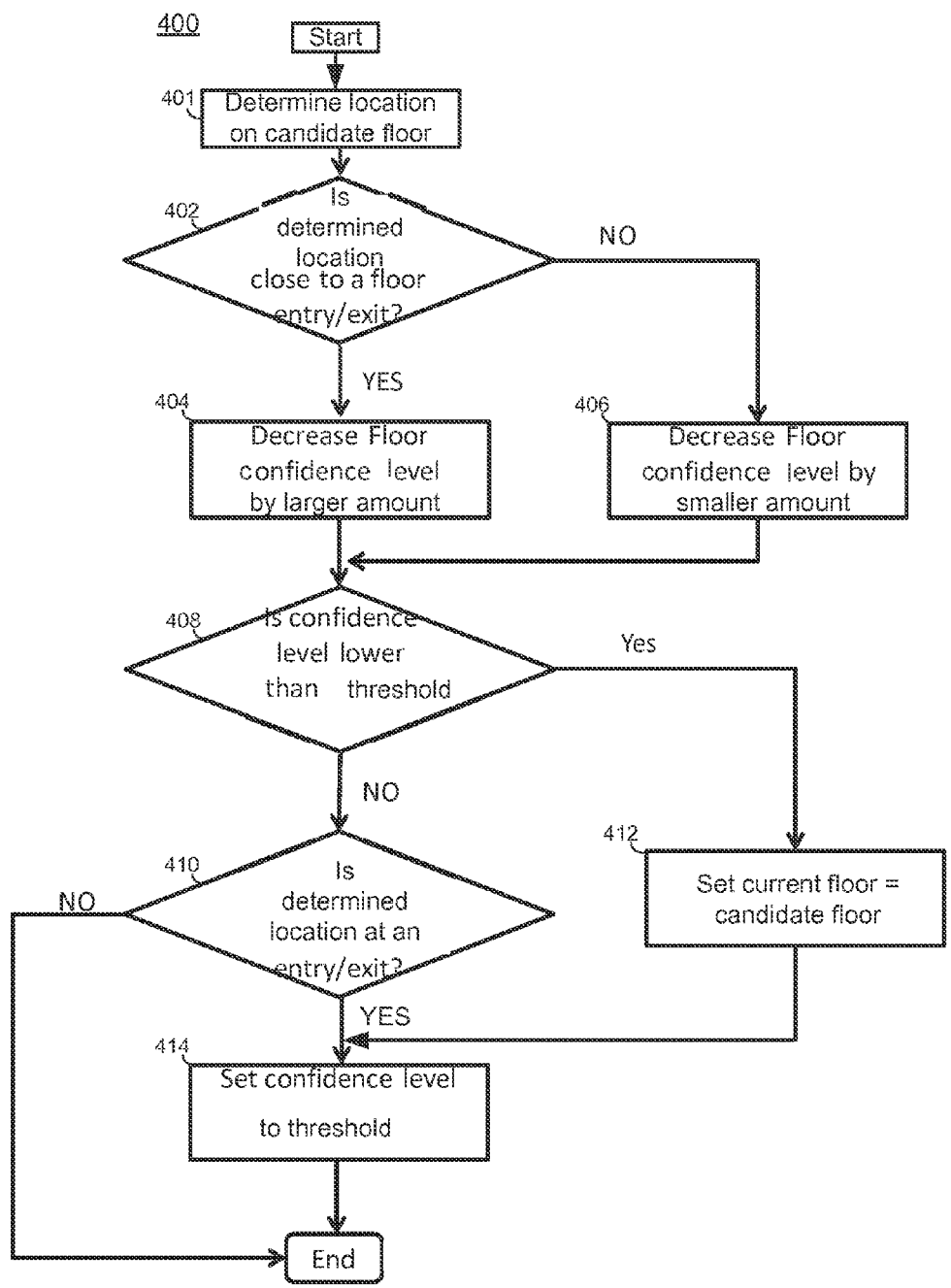
FIG. 4 is a flowchart of an example method expanding on decreasing a floor confidence level in the method of FIG. 3.

FIG. 4 is a flowchart of an example method 400 expanding on the decrease in confidence level 310 of method 300.

At 401 a location of client device 106 on the candidate floor is determined. The location may be determined using known trilateration techniques based on (i) the signal strengths measured at 302, and (ii) the corresponding RP-related information, such as the transmitter powers (of transmitters associated with the RPs) and their known locations corresponding to the measured signal strengths. In trilateration, as an approximation, the measured signal strength may be considered to be inversely proportional to the distance between client device 106 and the RP. Using measured signal strengths corresponding to multiple RPs improves the accuracy of the client device location. For example, using measured signal strength from a single transmitter locates the client device to a radial distance between the client device and the RP (i.e., locates the client device on any point of a circumference of a circular area surrounding the RP, where the circular area has a radius equal to a distance between the client device and the RP). Using measured signal strengths from two RPs locates the client device to one of two points where the circumferences of the two circular areas overlap. Using measured signal strengths from three or more RPs triangulates the location of the client device to a point.

At 402 it is determined whether the location determined at 401 is within a predetermined distance of any known entry/exit (i.e., access way) of the candidate floor (i.e., an entry/exit having a known location on the candidate floor). For example, with reference to FIG. 2, at 402 it is determined if the location of client device 106 is within a predetermined distance of one of entries/exits E1, E2, and E3. The predetermined distance may be any suitable distance, such as from 10 to 15 feet. The known locations of the access ways may be stored in one or more databases in servers associated with building communication network 104 and accessible to client device 106, such as a database associated with, e.g., linked to, the RP-related information for a given building, such as the RP-related information in Table 1. Such access way location databases may be accessed by client device 106 as necessary, e.g., via a request/response communication protocol, when method 300 is executed. The access way location databases may also be stored in servers 108, for example. In an alternative embodiment, locations of the access ways may be defined according to fingerprinting techniques and accessible to client device 106, as would be appreciated by those of ordinary skill in the relevant arts.

If at 402 it is determined that the determined location is within the predetermined distance of the entry/exit, then flow proceeds to 404, where the confidence level is decreased by a predetermined first amount, such as, e.g., between 2 and 5, which represents a relatively large amount. Then flow proceeds to 408. If the determined location is within the predetermined distance of the entry/exit, it is considered to be "close to" the entry/exit, and it is assumed that a possible floor change is imminent. The relatively large decreases at 404 correspondingly increases the likelihood that the current floor will change, i.e., the larger increment hastens the rate at which the current floor will change.

In an alternative embodiment, method 300 may determine a direction in which client device 106 is travelling on the candidate floor over time. If it is determined that the direction is toward a known access way, then at 404 the confidence level is decreased by the predetermined first amount.

If at 402 it is determined that the determined location in not within the predetermined distance of the entry/exit (or, in the alternative embodiment, not travelling in a direction toward the entry/exit), then flow proceeds to 406, where the confidence level is decreased by a predetermined second amount, such as, e.g., 1, that is less than the predetermined first amount and, therefore, considered a relatively small amount. Then flow proceeds to 408.

At 408 it is determined again if the confidence level is below the threshold.

If at 408 it is determined that the confidence level is below the threshold, then at 412 the current floor is set equal to, i.e., replaced with the candidate floor, and flow proceeds to 414.

At 414 the floor confidence level is set equal to the threshold, and then method 400 ends.

If at 408 it is determined that the confidence level is not below the threshold, then flow proceeds to 410.

Whereas at 402 it was determined if the location was close to an entry/exit, at 410 it is determined if the location coincides with, i.e., is at, the entry/exit, 410 may include a distance test similar to that in 402, except that in 410 the predetermined distance within which the location must fall is less than the predetermined distance used in 402, e.g., the predetermined distance may be close to zero, such as two or three feet, instead of ten or fifteen feet. Therefore, at 410 it is determined if the location is within a predetermined distance of an entry/exit, where the predetermined distance is less than the predetermined distance in 402. In another embodiment, the entry/exit may correspond to a range or band of locations, and at 402 it is determined if the client device location is within the range or band of locations that corresponds to the entry/exit, and thereby coincides with the entry/exit.

If at 410 it is determined that the location does not coincide with the entry/exit, then method 400 ends.

If at 410 it is determined that the location coincides with the entry/exit, then at 414 the floor confidence level is set equal to the threshold, and then method 400 ends.

Figure 5:
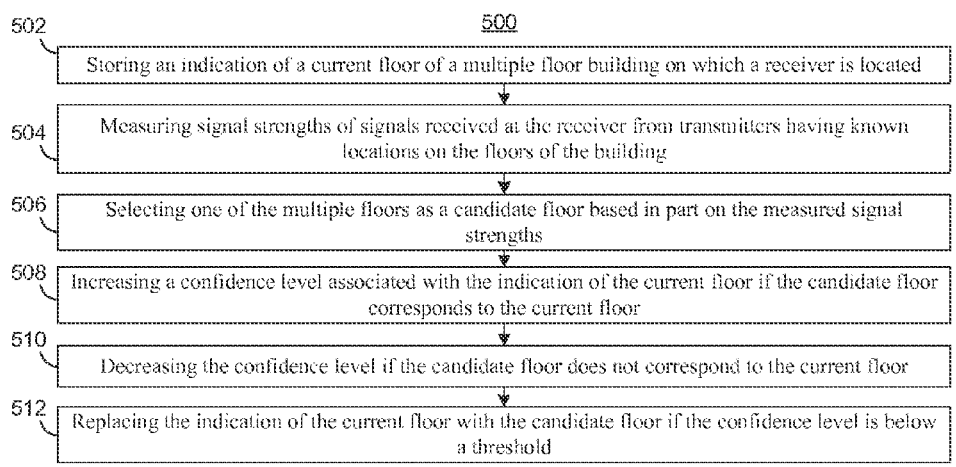
FIG. 5 is a flowchart of a summary method of determining a floor of a multiple floor building on which a device is located, according to an embodiment.

FIG. 5 is a flowchart of an example summary method 500 of determining a floor of a multi-floor building on which a device, such as client device 106, is located. Method 500 may be performed in connection with an LBS.

502 includes storing an indication of a current floor of the multiple floor building on which the device is located.

504 includes measuring signal strengths of signals received at the device (which includes a receiver to receive the signals and measure their signals strengths) from transmitters (i.e., transmitters of the RPs) having known locations on the floors of the building.

506 includes selecting one of the multiple floors as a candidate floor based in part on the measured signal strengths.

508 includes increasing a confidence level associated with the indication of the current floor if the candidate floor corresponds to, i.e., is the same as, the current floor.

510 includes decreasing the confidence level the candidate floor does not correspond to the current floor.

512 includes replacing the indication of the current floor with the candidate floor if the confidence level is below a threshold.

Figure 6:
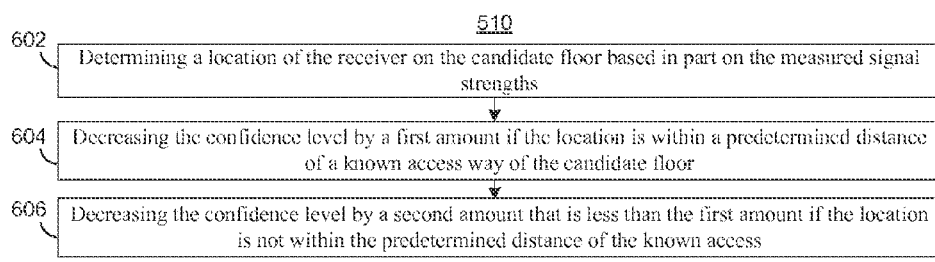
FIG. 6 is a flowchart of an example method expanding on decreasing a confidence level in the method of FIG. 5.

FIG. 6 is a flowchart of an example method expanding on the decreasing at 510 of method 500.

602 includes determining a location of the device on the candidate floor based in part on the measured signal strengths.

604 includes decreasing the confidence level by a first amount if the location is within a predetermined distance of a known access way of the candidate floor.

606 includes decreasing the confidence level by a second amount that is less than the first amount if the location is not within the predetermined distance of the known access.

Figure 7A:
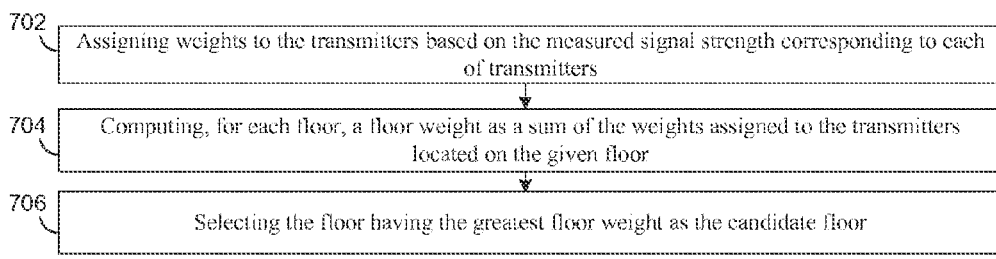
FIG. 7A is a flowchart of an example method expanding on selecting a candidate floor in the method of FIG. 5, according to a first method of selecting.

FIG. 7A is a flowchart of an example method expanding on the selecting at 506 of method 500, corresponding to Candidate Floor Selection Method 1.

702 includes assigning weights to the transmitters based on the measured signal strength corresponding to each of transmitters.

704 includes computing, for each floor, a floor weight as a sum of the weights assigned to the transmitters located on the given floor.

706 includes selecting the floor having the greatest floor weight as the candidate floor.

Figure 7B:
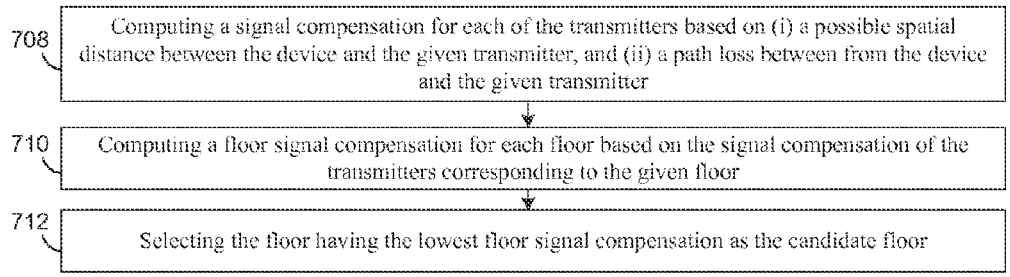
FIG. 7B is a flowchart of an example method expanding on selecting a candidate floor in the method of FIG. 5, according to a second method of selecting.

FIG. 7B is a flowchart of an example method expanding on the selecting at 506 of method 500, corresponding to Candidate Floor Selection Method 2.

708 includes computing a signal compensation for each of the transmitters based on (i) a possible spatial distance between the device and the given transmitter, and (ii) a path loss between from the device and the given transmitter.

710 includes computing a floor signal compensation for each floor based on the signal compensation of the transmitters corresponding to the given floor.

712 includes selecting the floor having the lowest floor signal compensation as the candidate floor.

Systems

Figure 8:
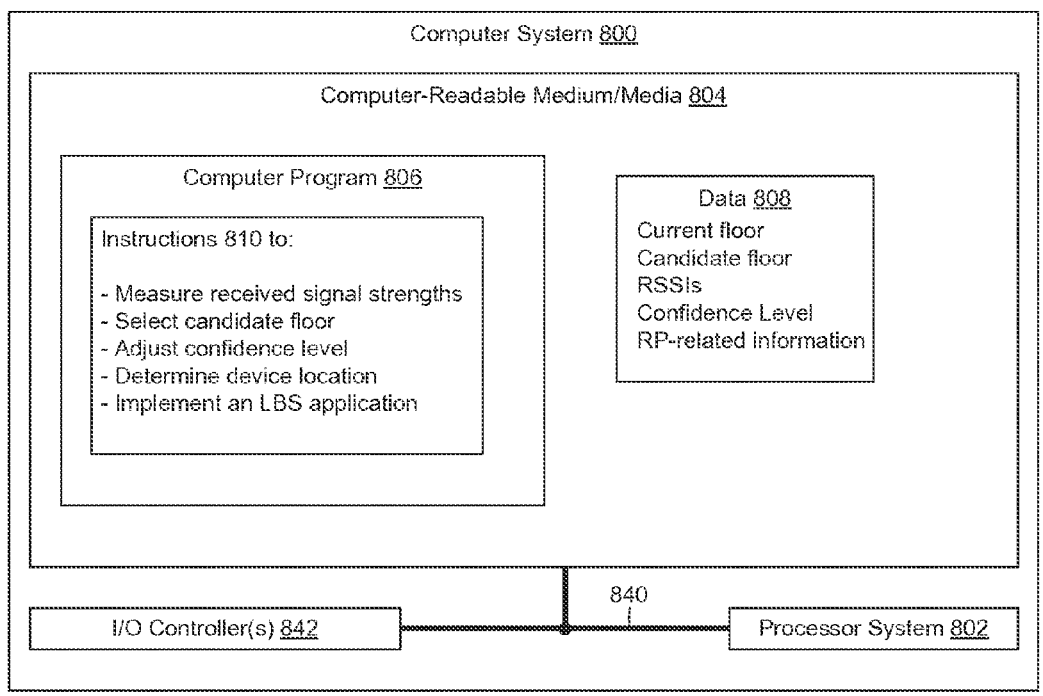
FIG. 8 is a block diagram of an example computer system.

FIG. 8 is a block diagram of an example computer system 800, configured to determine a location of a client device in a building, including a floor in the building on which the client device is located, in accordance with embodiments described herein. Computer system 800 may be incorporated in client device 106 and/or servers 108.

Computer system 800 includes one or more processors, illustrated here as a processor 802, to execute instructions of a computer program 806. Computer system 800 further includes a computer-readable medium or media (medium) 804.

Processor 802 may include one or more instruction processors and/or processor cores, and a control unit to interface between the instruction processor(s)/core(s) and medium 804. Processor 802 may include, without limitation, one or more of a microprocessor, a graphics processor, a physics processor, a digital signal processor, a network processor, a front-end communications processor, a co-processor, a management engine (ME), a controller or microcontroller, a central processing unit (CPU), a general purpose instruction processor, an application-specific processor.

Medium 804 may include a transitory or non-transitory computer-readable medium, and may include, without limitation, registers, cache, and memory. Such memory may include non-volatile and volatile memory, such as read-only memory (ROM), including programmable ROM, and random access memory (RAM).

Medium 804 includes a computer program 806 encoded therein, including instructions to be executed by processor 802. Computer-readable medium 804 further includes data 808, which may be used by processor 802 during execution of computer program 806, and/or generated by processor 802 during execution of computer program 806. Data 808 may include variables representing current floor, candidate floor, and confidence level. Data may also include RSSIs and RP-related information.

In the example of FIG. 8, computer program 806 includes sets of instructions 810 that when executed cause processor 802 to determine a location of a client device and a floor a building on which the device is located, such as described in one or more examples above. Instructions 810 include instructions to measure signal strengths, select a candidate floor, adjust a confidence level, determine device location, and implement an LES application.

Computer system 800 may include communications infrastructure 840 to communicate amongst devices and/or resources of computer system 800.

Computer system 800 may include one or more input/output (I/O) devices and/or controllers 842 to interface with one or more other systems, such as communication systems.

Methods and systems disclosed herein may be implemented with respect to one or more of a variety of systems, such as described below with reference to FIG. 9. Methods and systems disclosed herein are not, however, limited to the examples of FIG. 9.

Figure 9:
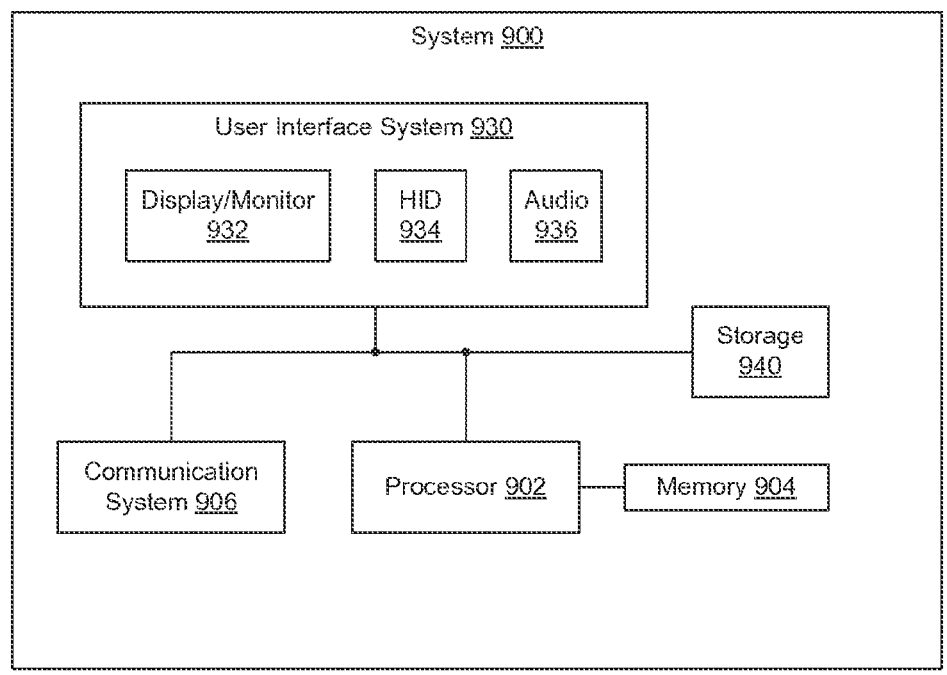
FIG. 9 is a block diagram of an example system.

FIG. 9 is a block diagram of a system 900, which may represent client device 106, including a processor 902 and associated memory, cache, and/or other computer-readable medium, illustrated here as memory 904. System 900 further includes a communication system 906 and a user interface system 930. System 900 may further include an electronic or computer-readable storage medium (storage) 940, which may be accessible to processor 902, communication system 906, and/or user interface system 930.

Communication system 906 may include a wired and/or wireless communication system, and may be configured to communicate with an external communication network on behalf of processor 902 and user interface system 930. The external network may include a voice network (e.g., a wireless telephone network), and/or a data or packet-based network (e.g., a proprietary network and/or the Internet). In an embodiment, communication system 906 includes transceiver components, such as a receiver and a transmitter, to communicate with network 110 and building communication system 104, and to measure signal strengths of signals received there from.

User interface system 930 may include a monitor or display 932 and/or a human interface device (HID) 934. HID 934 may include, without limitation, a key board, a cursor device, a touch-sensitive device, a motion and/or image sensor, a physical device and/or a virtual device, such as a monitor-displayed virtual keyboard. User interface system 930 may include an audio system 936, which may include a microphone and/or a speaker.

System 900 may be configured as a stationary or portable/hand-held system, and may be configured as, for example, a mobile telephone, a set-top box, a gaming device, and/or a rack-mountable, desk-top, lap-top, notebook, net-book, note-pad, or tablet system, and/or other conventional and/or future-developed system(s). System 900 is not, however, limited to these examples, Further Embodiments and Examples The following examples pertain to further embodiments.

Example 1 includes a non-transitory computer-readable medium encoded with a computer program to determine a current floor on which a device is located in a multiple floor building, including instructions to cause a processor:

store an indication of the current floor of the building on which the device is located;

access measured signal strengths of signals received at the device from transmitters having known locations on the floors of the building;

select one of the multiple floors as a candidate floor based in part on the measured signal strengths;

increase a confidence level associated with the indication of the current floor if the candidate floor corresponds to the current floor;

decrease the confidence level if the candidate floor does not correspond to the current floor; and replace the indication of the current floor with the candidate floor if the confidence level is below a threshold.

Example 2 includes the subject matter of example 1, wherein the instructions to cause the processor to decrease further include instructions to cause the processor to:

determine a location of the device on the candidate floor based in part on the measured signal strengths;

decrease the confidence level by a first amount if the location is within a predetermined distance of a known access way of the candidate floor; and decrease the confidence level by a second amount that is less than the first amount if the location is not within the predetermined distance of the known access.

Example 3 includes the subject matter of example 2, wherein the instructions to cause the processor to decrease further include instructions to cause the processor to, after the confidence level is decreased by one of the first and second amounts:

replace the indication of the current floor with the candidate floor if the confidence level is below the threshold.

Example 4 includes the subject matter of claim 3, wherein the instructions to cause the processor to decrease further include instructions to cause the processor to, after the confidence level is decreased by one of the first and second amounts:

set the confidence level equal to the threshold if the confidence level is below the threshold and the location coincides with the access way.

Example 5 includes the subject matter of claim 1, wherein the instructions to cause the processor to select further include instructions to cause the processor to:

assign weights to the transmitters based on the measured signal strength corresponding to each of the transmitters;

compute a floor weight corresponding to each floor as a sum of the weights assigned to the transmitters located on the given floor; and select the floor having the greatest floor weight as the candidate floor.

Example 6 includes the subject matter of claim 1, wherein the instructions to cause the processor to decrease further include instructions to cause the processor to:

calculate a signal compensation for each of the transmitters based on (i) a possible spatial distance between the device and the given transmitter, and (ii) a path loss between from the device and the given transmitter;

calculate a floor signal compensation for each floor based on the signal compensation of the transmitters corresponding to the given floor; and select the floor having the lowest floor signal compensation as the candidate floor.

Example 7 includes an apparatus, comprising:

a processor and memory configured to:

store an indication of the current floor of a multiple floor building on which a device is located;

access measured signal strengths of signals received at the device from transmitters having known locations on the multiple floors of the building;

select one of the multiple floors as a candidate floor based in part on the measured signal strengths;

increase a confidence level associated with the indication of the current floor if the candidate floor corresponds to the current floor;

decrease the confidence level if the candidate floor does not correspond to the current floor; and replace the indication of the current floor with the candidate floor if the confidence level is below a threshold.

Example 8 The apparatus of claim 7, wherein the processor memory configured to decrease are further configured to:

determine a location of the device on the candidate floor based in part on the measured signal strengths;

decrease the confidence level by a first amount if the location is within a predetermined distance of a known access way of the candidate floor; and decrease the confidence level by a second amount that is less than the first amount if the location is not within the predetermined distance of the known access.

Example 9 includes the subject matter of claim 8, wherein the processor and memory configured decrease are further configured to, after the confidence level is decreased by one of the first and second amounts:

replace the indication of the current floor with the candidate floor if the confidence level is below the threshold.

Example 10 includes the subject matter of claim 9, wherein the processor and memory configured to decrease are further configured, after the confidence level is decreased by one of the first and second amounts:

set the confidence level equal to the threshold if the confidence level is below the threshold and the location coincides with the access way.

Example 11 includes the subject matter of example 7, wherein the processor and memory configured to select are further configured to:

assign weights to the transmitters based on the measured signal strength corresponding to each of the transmitters;

compute a floor weight corresponding to each floor as a sum of the weights assigned to the transmitters located on the given floor; and select the floor having the greatest floor weight as the candidate floor.

Example 12 includes the subject matter of example 7, wherein the processor and memory configured to select are further configured to:

calculate a signal compensation for each of the transmitters based on (i) a possible spatial distance between the device and the given transmitter, and (ii) a path loss between from the device and the given transmitter;

calculate a floor signal compensation for each floor based on the signal compensation of the transmitters corresponding to the given floor; and select the floor having the lowest floor signal compensation as the candidate floor.

Example 13 includes the subject matter of example 7, further comprising:

a user interface system; and a communication system, including a receiver to receive the signals and measure their signal strengths, to interface with a communication network and one or more of the processor and the user interface system; and a housing to house the processor and memory, the user interface system, and the communication system.

Example 14 includes the subject matter of example 13, wherein:

the communication system includes a wireless communication system; and the housing includes a mobile hand-held housing to house the processor and memory, the user interface, the communication system, and a battery.

Example 15 includes a method to determine a current floor on which a client device is located in a multiple floor building, comprising:

storing an indication of the current floor of the multiple floor building on which a device is located;

measuring signal strengths of signals received at the device from transmitters having known locations on the floors of the building;

selecting one of the multiple floors as a candidate floor based in part on the measured signal strengths;

increasing a confidence level associated with the indication of the current floor if the candidate floor corresponds to the current floor;

decreasing the confidence level if the candidate floor does no correspond to the current floor; and replacing the indication of the current floor with the candidate floor if the confidence level is below a threshold.

Example 16 includes the subject matter of example 15, wherein the decreasing includes:

determining a location of the device on the candidate floor based in part on the measured signal strengths;

decreasing the confidence level by u first amount if the location is within a predetermined distance of a known access way of the candidate floor; and decreasing the confidence level by a second amount that is less than the first amount if the location is not within the predetermined distance of the known access.

Example 17 includes the subject matter of example 16, wherein the decreasing further includes, after decreasing the confidence level by one of the first and second amounts:

replacing the indication of the current floor with the candidate floor if the confidence level is below the threshold.

Example 18 includes the subject matter of example 17, wherein the decreasing further includes, after decreasing the confidence level by one of the first and second amounts:

setting the confidence level equal to the threshold if the confidence level is below the threshold and the location coincides with the access way.

Example 19 includes the subject matter of example 15, wherein the selecting includes:

assigning weights to the transmitters based on the measured signal strength corresponding to each of the transmitters;

computing a floor weight corresponding to each floor as a sum of the weights assigned to the transmitters located on the given floor; and selecting the floor having the greatest floor weight as the candidate floor.

Example 20 includes the subject matter of example 15, wherein the selecting includes:

computing a signal compensation for each of the transmitters based on (i) a possible spatial distance between the device and the given transmitter, and (ii) a path loss between from the device and the given transmitter;

computing a floor signal compensation for each floor based on the signal compensation of the transmitters corresponding to the given floor; and selecting the floor having the lowest floor signal compensation as the candidate floor.

Example 21 includes at least one machine readable medium comprising a plurality of instructions that in response to being executed on a computing device, cause the computing device to carry out a method according to any one of examples 15 to 20.

Example 22 includes a communications device arranged to perform the method of any one of examples 15 to 20.

Example 23 includes a computer system to perform the method of any of examples 15 to 20.

Example 24 includes a machine to perform the method of any of examples 15 to 20.

Example 25 includes an apparatus comprising: means for performing the method of any of examples 15 to 20.

Example 26 includes an apparatus to determine a floor of a building on which a device is located, configured to perform the method of examples 15-20.

Example 27 includes a computing device comprising a chipset according to any one of the examples 15-20 and memory to determine a floor of a building on which a device is located.

One or more features disclosed herein may be implemented in, without limitation, circuitry, a machine, a computer system, a processor and memory, a computer program encoded within a computer-readable medium, and/or combinations thereof. Circuitry may include discrete and/or integrated circuitry, application specific integrated circuitry (ASIC), a system-on-a-chip (SOC), and combinations thereof.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed. While various embodiments are disclosed herein, it should be understood that they are presented as examples. The scope of the claims should not be limited by any of the example embodiments disclosed herein.

What is claimed is:

1. A non-transitory computer-readable medium encoded with a computer program that includes instructions to cause a processor of one or more of device and a server to track movement of the device within a multiple floor structure, including to:

report an initial floor of the multiple floor structure on which the device is located to a location based service;

determine if the device subsequently moves to another floor of the multiple floor structure, including to, select one of the multiple floors of the multiple floor structure as a candidate floor of the device based on wireless signals received at the device from wireless transmitters located on a plurality of the floors of the multiple floor structure;

increment a count if the candidate floor matches the initial floor, decrement the count if the candidate floor does not match the initial floor, and report the candidate floor to the location based service as the floor on which the device is located if the decremented count is below a threshold.

2. The non-transitory computer-readable medium of claim 1, further including instructions to cause the processor to:

determine a location of the device on the candidate floor based the wireless signals received at the device; and if the candidate floor does not match the initial floor, decrement the count by a first amount if the location is within a first predetermined distance of an access path between the initial floor and the candidate floor, decrement the count by a second amount that is less than the first amount if the location is not within the first predetermined distance of the access path, and report the candidate floor to the location based service as the floor on which the device is located if the decremented count is below the threshold.

3. The non-transitory computer-readable medium of claim 2, further including instructions to cause the processor to:
decrement the count if the candidate floor matches the initial floor and the location of the device is within the first predetermined distance of the access path.

4. The non-transitory computer-readable medium of claim 2, further including instructions to cause the processor to:
set the count to the threshold if the count is above the threshold and the location is within a second predetermined distance of the access path, wherein the second predetermined distance is less than the first predetermined distance.

5. The non-transitory computer-readable medium of claim 1, further including instructions to cause the processor to:
assign a weight to each of the transmitters based on strengths of the wireless signals received from the respective transmitters;
compute a weight for each of the multiple floors based on the weights assigned to the transmitters located on the respective floors; and
select the candidate floor based on the weights of the respective floors.

6. The non-transitory computer-readable medium of claim 1, further including instructions to cause the processor to:
compute spatial distances between the device and the respective transmitters based on spatial dispersion;
compute path losses between the device and the respective transmitters;
calculate a compensation parameter for each of the transmitters based on the respective spatial distances and the respective path losses;
calculate a compensation parameter for each of the multiple floors based on the compensation parameters of the transmitters located on the respective floors; and
select the candidate floor based on the compensation parameters of the respective floors.

7. An apparatus, comprising, a processor and memory of one or more of a device and a server, configured to track movement of the device within a multiple floor structure, including to:
report an initial floor of the multiple floor structure on which the device is located, to a location based service; and
determine if the device subsequently moves to another floor of the multiple floor structure, including to,
select one of the multiple floors of the multiple floor structure as a candidate floor of the device based on wireless signals received at the device from wireless transmitters located on a plurality of floors of the multiple floor structure,
increment a count if the candidate floor matches the initial floor,
decrement the count if the candidate floor does not match the initial floor, and
report the candidate floor to the location based service as the floor on which the device is located if the decremented count is below a threshold.

8. The apparatus of claim 7, wherein the processor and memory are further configured to:
determine a location of the device on the candidate floor based the wireless signals received at the device; and
if the candidate floor does not match the initial floor,
decrement the count by a first amount if the location is within a predetermined distance of an access path between the initial floor and the candidate floor,
decrement the count by a second amount that is less than the first amount if the location is not within the predetermined distance of the access path, and
report the candidate floor to the location based service as the floor on which the device is located if the decremented count is below the threshold.

9. The apparatus of claim 8, wherein the processor and memory are further configured to:
decrement the count if the candidate floor matches the initial floor and the location of the device is within the first predetermined distance of the access path.

10. The apparatus of claim 8, wherein the processor and memory are further configured:
set the count to the threshold if the count is above the threshold and the location is within a second predetermined distance of the access path, wherein the second predetermined distance is less than the first predetermined distance.

11. The apparatus of claim 7, wherein the processor and memory are further configured to:
assign a weight to each of the transmitters based on strengths of the wireless signals received from the respective transmitters;
compute a weight for each of the multiple floors based on the weights assigned to the transmitters located on the respective floors; and
select the candidate floor based on the weights of the respective floors.

12. The apparatus of claim 7, wherein the processor and memory are further configured to:
compute spatial distances between the device and the respective transmitters based on spatial dispersion;
compute path losses between the device and the respective transmitters;
calculate a compensation parameter for each of the transmitters based on the respective spatial distances and the respective path losses;
calculate a compensation parameter for each of the multiple floors based on the compensation parameters of the transmitters located on the respective floors; and
select the candidate floor based on the compensation parameters of the respective floors.

13. The apparatus of claim 7, wherein the device includes:
the processor and memory of the device;
a user interface system;
a wireless communication system to receive the wireless signals, measure strengths of the wireless signals, and interface between the location based service and the processor of the device; and
a housing to house the processor and memory of the device, the user interface system, and the wireless communication system.

14. The apparatus of claim 13, wherein:
the housing includes a mobile hand-held housing to house the processor and memory of the device, the user interface, the wireless communication system, and a battery.

15. A method of tracking movement of a device within a multiple floor structure at of one or more of the device and a server, comprising:
reporting an initial floor of the multiple floor structure on which the device is located to a location based service;
determining if the device subsequently moves to another floor of the multiple floor structure, including, selecting one of the multiple floors of the multiple floor structure as a candidate floor of the device based on wireless signals received at the device from wireless transmitters located on a plurality of the floors of the multiple floor structure, incrementing a count if the candidate floor matches the initial floor, decrementing the count if the candidate floor does not match the initial floor, and reporting the candidate floor to the location based service as the floor on which the device is located if the decremented count is below a threshold.

16. The method of claim 15, wherein:

the determining further includes determining a location of the device on the candidate floor based on the wireless signals received at the device; and wherein the decrementing includes, decrementing the count by a first amount if the location is within a first predetermined distance of an access path between the initial floor and the candidate floor, decrementing the count by a second amount that is less than the first amount if the location is not within the first predetermined distance of the access path, and reporting the candidate floor to the location based service as the floor on which the device is located if the decremented count is below the threshold.

17. The method of claim 16, further including:

decrementing the count if the candidate floor matches the initial floor and the location of the device is within the first predetermined distance of the access path.

18. The method of claim 16, further including:

setting the count to the threshold if the count is above the threshold and the location is within a second predetermined distance of the access path, wherein the second predetermined distance is less than the first predetermined distance.

19. The method of claim 15, wherein the selecting includes:

assigning a weight to each of the transmitters based on strengths of the wireless signals received from the respective transmitters;

computing a weight for each of the multiple floors based on the weights assigned to the transmitters located on the respective floors; and selecting the candidate floor based on the weights of the respective floors.

20. The method of claim 15, wherein the selecting includes:

computing spatial distances between the device and the respective transmitters based on spatial dispersion;

computing path losses between the device and the respective transmitters;

computing a compensation parameter for each of the transmitters based on the respective spatial distances path losses;

computing a compensation parameter for each of the multiple floors based on the compensation parameters of the transmitters located on the respective floors; and selecting the candidate floor based on the compensation parameters of the respective floors.

* * * * *